April 5, 1966         H. LUEDER         3,244,856

CONDITIONING THE CLIMATE OF A ROOM

Filed April 26, 1963         5 Sheets-Sheet 1

INVENTOR

HOLGER LUEDER

BY Bacon & Thomas

ATTORNEYS

INVENTOR
HOLGER LUEDER
BY Bacon & Thomas
ATTORNEYS ns, Zurich, Switzerland
United States Patent Office 3,244,856
Patented Apr. 5, 1966

3,244,856
CONDITIONING THE CLIMATE OF A ROOM
Holger Lueder, Winterthur, Switzerland, assignor to
Friedr. Julius Maas, Zurich, Switzerland
Filed Apr. 26, 1963, Ser. No. 276,057
7 Claims. (Cl. 219—213)

This invention relates to an improvement in the method described and claimed in former patents of the applicant relating to the creation of radiation climate in a room equipped with windows in the outer wall, the air temperature in the room being decreased in relation to the effective radiation temperature (see French patent No. 1,235,408, Italian Patent No. 622,645 and Austrian Patent No. 219,240).

In a living or working room for persons the heat produced in their bodies by burning up food should be absorbed from the human body uniformly to all directions especially towards large windows. To attain this, the former patents have proposed to maintain the room, during the summer as well as during the winter, at a radiation temperature in the range of 25 to 15° C. by a tempered radiation surface which is highly emissive and absorptive of heat radiations and which acts as a heat source or a heat sink and which is larger than the area of the window surface of the room, which is not screened from solar radiation, thus maintaining the said radiation temperature uniform throughout the whole room by a temporary constant tempering (heating or cooling) of the said radiation surface and by single or multiple reflection of heat radiation from reflecting layers covering at least some of the room boundary surfaces and which layers are highly absorptive of heat. Furthermore, it has been proposed to maintain the air in the room at least in the winter, by ventilation at substantially the same temperature as that at which the inner window surface and the inner surface of the exterior wall, or layers covering such surfaces, are maintained by radiation exchange with the other surfaces, and keeping the motion of the air in the room as low as is necessary to prevent noticeable drafts, i.e. a decreasing of the air velocity below 0.1 meter per second by providing the condition required for stable stratification of the air with the temperature increasing upwards and/or by uniform distribution of the fresh air introduced.

The problem of maintaining a radiation climate in a living or working room is only partly solved—according to results gained by practical use—by the means and measures disclosed in the former patents which are sufficient, at most, only with rooms having small windows. But now the improvement according to the present invention enable the maintenance of such a radiation climate in a room having large windows and in a manner commercially feasible.

For a better understanding of the invention it may be pointed out that for maintaining a desired radiation climate in a living or working room for persons the following five factors are significant:

(1) The windows and their behaviour relative to visible and heat radiations as well as the effective radiation temperature ($T_s^*$) which takes into consideration also the increase in radiation energy of the penetrating sun and sky light;

(2) The tempered radiation surface, i.e., that room boundary surfaces which may be heated or cooled to a desired radiation temperature;

(3) The exterior walls;

(4) The inner boundaries comprising all surfaces not being tempered and not being exterior walls but including the ceiling;

(5) The air in the room.

All the five factors are significant when seeking to create and maintain a suitable radiation climate which meets all requirements. The former patents do not take care of all five factors to the necessary extent as evident from the following explanations.

The method according to the former patents fails to attain the desired equalization of all the boundary surfaces of the room because—especially in the winter—the effective radiation temperature of the inner window pane is too low in comparison to the radiation temperature of the other boundary surfaces. With large windows this fact would result in an undesirable one-sided heat radiation from the body of a person staying in the room. The vertical window chimney described in the former patents only partly overcomes this deficiency.

The use of the floor as a heat source or heat sink to supply or remove heat—as disclosed in the former patents—is sufficient only when the desired equalization of all radiation temperatures is substantially attained. Only the improvements according to the present invention guarantee a true equalization.

Normally the exterior walls which are boundary surfaces being highly absorptive of heat are covered—according to the teaching of the former patents—with a layer that is transparent to visible light, but reflecting in the range of heat radiations. The reflection of heat radiation at such layers is indispensible to the present method, but the surface of the layer itself has the temperature of the wall. Because of the reflecting layer no radiation from the room is absorbed by the wall and its temperature in some cases may be lower than the temperature of the inner window pane and cause an undesired cold air draft.

Referring to the inner walls, there is a deficiency, which is not overcome by covering such walls with a heat reflecting layer, that is the heating of the cool air supplied to the room by reason of the wall temperature which is high because such walls have normally a rather good thermal contact with the tempered floor.

The above mentioned deficiencies of exterior and of inner walls are overcome by the improvements according to the present invention.

The stratification of the air and the maintenance of an air temperature equal to that of the inner window pane, both required by the method claimed in the former patents, can be attained only with an amount of supplied air, which is higher than the demand for fresh air by the person staying in the room. The improvements according to the present invention result in a considerable reduction of air supply and therefore also of energy demand.

Summarized, the improvements according to the present invention reside in the removal of the radiation draft from large windows, the reduction of energy demand sufficient to use the floor as the only tempered surface, the removal of the unpleasant cold air draft caused by too cold exterior walls, the removal of an undesired air heating by too hot inner walls and to a reduction of the demand for fresh air.

The method according to the present invention results in the above summarized improvements in that the thermal conductance, including the losses through the joints between the inner and the outer window panes are decreased to a value of 1 to 2.5 kcal. per square meter of window area per hour and per ° C. and the temperature gradient therebetween is increased, in that by a uniform supply of cool fresh air, the air temperature in the room is decreased by an amount equal to the daily mean value of the window's effective radiation temperature relative to the temperature of the inner pane, and in that the outer and the inner walls are thermally insulated under heat reflecting layers and the heat transmission between the said layers and the said walls is reduced.

Some embodiments of the invention will now be described in detail in conjunction with FIGS. 1 to 6 of the attached drawings in which.

Figure 1:
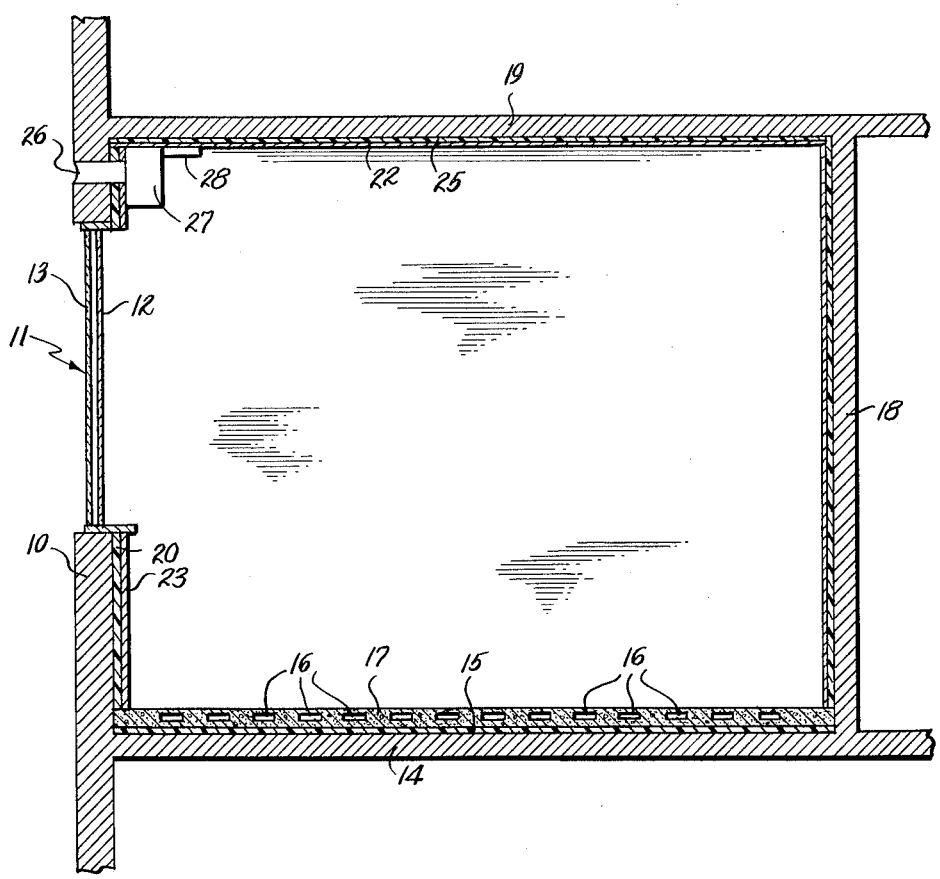
FIG. 1 is a longitudinal section through an embodiment of a room according to the invention, shown schematically.

In FIG. 1, a preferred embodiment of a room designed according to the invention is represented schematically. The exterior wall 10 is equipped with a compound window 11 shown only diagrammatically by inner and outer window panes 12 and 13 respectively. The design of the compound window 11 will be described later with reference to FIGS. 5 and 6.

The floor 14 forms a controlled radiation surface comprising a thermal insulation stratum 15 and a plurality of elements 16 designed to supply or to remove heat, which are embedded in a layer 17 of a material having a high emissivity and absorptivity for heat. The stratum 15 may be any suitable thermal insulating material, for example a plastic foam available on the market. The elements 16 may be hollow conduits for conducting a heating or cooling medium and may be embedded in a layer of known PVC material (polyvinyl chloride).

The other room boundaries are the inner walls (in FIG. 1 only the rear wall 18 is shown) and the ceiling 19.

The exterior wall 10 as well as the inner walls 18 and the ceiling 19 are covered with a thermal insulating material 20, 21 and 22, respectively, for example a plastic foam. The surface of this insulating cover carries a layer of a material of good reflecting characteristics but of low heat radiating ability in the wavelength range of about 300° K. (Kelvin) and may be for example bright rolled aluminum sheets.

Above the compound window 11, the exterior wall 10 is provided with an opening 26 to suck in fresh air by a fan 27 having an output channel 28 arranged to uniformly distribute the fresh air along the ceiling 19 and the layer 25.

The present method produces a biologically unobjectionable room climate using an air temperature cooler than 19° C. without discomfort, so that a draining of mucous membranes in the throat and in the breathing passages is avoided as well as the appearance of unpleasant heat stagnations in the body during physical activities and the soporific effect of the temperature control mechanism in the human body. This is attained to a degree by the steps disclosed in the former patents. Furthermore, the lowering of the air temperature in the room to be approximately equal to the temperature of the inner window pane removes the troublesome cold air draft otherwise caused by the cold air falling down from the window. The radiation temperatures of the boundaries in a room designed according to the former patents are equalized one to another but the temperature of the inner window pane is mostly too low and to stay near the window for a while produces discomfort. In addition a one-sided radiation draft appears in the direction of the window.

One-sided removal of heat from the human body is well known to be unhealthy because the control mechanism of the body is incapable of compensating the manner normal for uniform heat loss. It is particularly detrimental if individual portions of the normally dressed human body is radiating throughout a large angle to a surface having a radiation temperature lower than 18°C. For example, the radiation from the feet and legs during substantial time to a poorly insulated floor having 16° C. temperature as well as the permanent radiation from the back to an exterior wall as cold as 18° C. can cause bad colds, sickness or rheumatism.

To avoid radiation draft towards the window during cold days in a room designed according to the invention, the heat resistance of the compound window 11 in FIG. 1 and hence the temperature gradient through the same is increased by such an amount that the effective radiation temperature $T_s^*$ of the inner window pane 12 is not substantially lower than the mean value $T_{si}$ of the radiation temperature of all other room boundaries. The value $T_s^*$ is that radiation temperature which takes into consideration the radiation energy of the sun and sky radiation penetrating the window.

Figure 6:
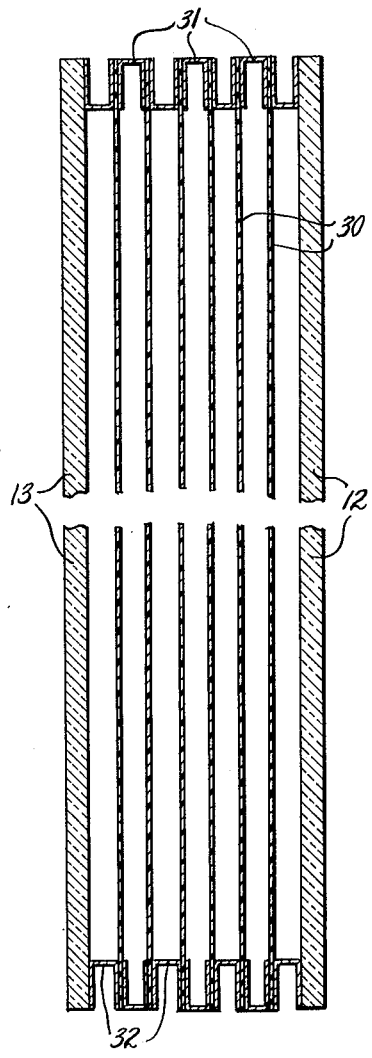

The high heat resistance of the compound window 11 it attained by arranging a sufficient number of thin transparent films in the intermediate space between the inner and the outer window panes 12 and 13. In the embodiment of FIG. 6 six such films are shown, each of the said films reflects and/or absorbs heat radiation in the range of 300° K. at least as strongly as visible light radiation. Preferably, the refraction coefficient and/or the absorption coefficient for heat radiation should be higher than for visible light. The heat stream caused by the heat radiation exchanges between room and window 11 and flowing towards the inner window pane 12 and therefrom outwards to the surroundings is sufficient to produce a temperature gradient between the inner pane 12 and the surroundings resulting in an effective radiation temperature of the inner pane 12 which is comparable to the mean value $T_{si}$ of the radiation temperature of all other room boundaries and is not so low that a radiation draft is felt at the window.

For especially unfavorable cases the said heat stream may be assisted by electrical heating of the inner window pane 12. Using normal window glass panes such a heating may be carried out by thin heating filaments which are stretched in equal distance between the inner window pane 12 and the next following film and be heated by an electrical current flow. It is also possible to carry out a homogenous heating by using a glass with a good electrical conductivity for the inner pane 12 and arranging two electrodes at opposite edges of the pane to supply it with electric current.

Figure 5:
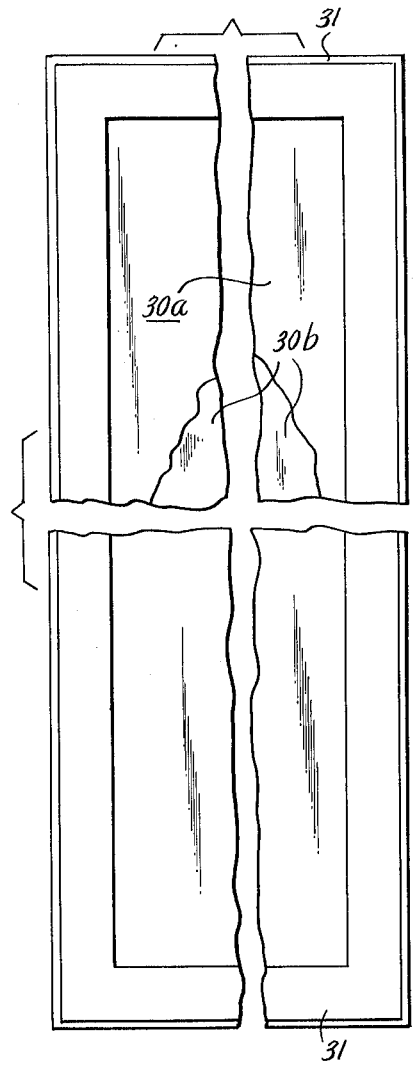
FIGS. 5 and 6 respectively illustrate two embodiments of the compound windows used in a room according to FIG. 1.

A design of a compound window suitable for the present method is shown in FIG. 6 and comprises six thin transparent foils 30, stretched wrinkle free and plane-parallel to each other betwen the inner and the outer window panes 12 and 13, respectively. The foils 30 must be stable to light and are made from polyethylene or polyethylene-terephthalate having a thickness of 6 microns. Preferably, as shown in FIG. 5, two such foils 30a and 30b are fixed to opposite flat portions of a frame 31 made from U-shaped metal rails, for example, by cementing or welding. Three of the said frames 31 each equipped with a foil on both sides are connected together in an airtight manner and to the panes 12 and 13 by metal bridges 32 (FIG. 6).

It may be pointed out that other designs of such compound windows comprising a multiple number of intermediate films between the inner and the outer pane 12 and 13, may be used to carry out the present method.

To minimize the light losses caused by the foils in such compound windows, the said foils may be covered in well known manner by a so-called λ/4 layer. It is known to use vaporized or cathodic sputtered layers of metal oxides; the production of such layers is quite economical for long foil tape.

To compensate for the light losses caused by the foils arranged inside the said compound windows it is possible to enlarge the whole window area in a room. For example, in the room shown in FIG. 1 the window 11 may be enlarged to occupy the whole exterior wall 10.

It is also possible to arrange more than six films or foils in the intermediate space between the inner and the outer outer panes 12 and 13 of such a compound window 11. Wrinkle free stretched foils guarantee a clear view from the room outwards through such a window.

To realize the desired increase in the heat resistance with a minimum of expenditure and to minimize any troubles caused by reflected sun light, the stretched foils 30 are arranged at equal distances apart, of at least 2 mm. and not more than 19 mm. between each other and the window panes.

The efficiency of each single foil may be increased by using the best thickness and a suitable material. The intensity of reflected heat radiation has the highest value for the portions of the radiation spectrum forming a standing wave with a few nodes in the foil. Each foil with a refraction coefficient of $n$ for the mean heat radiation should have a thickness equal to $1/2n$ times that wavelength at which the spectrum of the heat radiation of 300° K. measured in air passes a maximum. To comprehend the whole range of higher intensities of the spectrum the thickness of each foil should be chosen between a low value equal to $6.5/2n$ microns and a high value equal to about $32/2n$.

The distance between adjacent foils and between the first and last foils and the adjacent window panes may be minimized to 2 mm. but is preferably larger than 6 mm. to decrease the influence of the thermal conductivity of the air in the intermediate spaces. This rule may lead to compound windows of an overall thickness impractically high and using a large number of intermediate foils. This may be overcome by filling the intermediate spaces in the compound window with a dry gas having a heat conductivity less than air. Carbon dioxide would be a suitable gas.

Preferably the transparent materials which are stable for light are those foil materials having a refraction and/or absorption coefficient considerably higher for heat radiation of 300° K. than for visible radiation.

To avoid the appearance of cold air drafts at the window 11 in such a room as shown in FIG. 1, uniformly distributed cool fresh air is supplied to the room to lower the air temperature by an amount equal to the daily average effective radiation temperature $T_s{}^*$ (in the absence of sun radiation) of the inner window pane 12 (having a transparency $\tau$) compared to the true temperature of the said inner pane 12. Penetration of the blue sky light produces an effective radiation temperature $T_s{}^*$ which is increased at noon more than $\tau \cdot 10°$ C. over the true temperature of the inner pane 12. With a transparency of about 50% for the described compound window the air in the room may be maintained 3 to 5° C. cooler than the inner window pane 12, so the air need not be cooled at much as was necessary hitherto for avoiding the cold air draft at normal double windows as described in the former patents. This is the reason why the tempered radiation surface, in the room of FIG. 1, the floor 14 carrying the layer 17, needs to deliver only a small amount of heat to the air in the room by convection. The heat economy advantage of the present method is also enhanced by increasing the window's ratio of light to heat conductance by increasing the number of intermediate foils so that the heating energy necessary for a room shown in FIG. 1 is absorbed in accordance with the penetrating sun and sky radiation.

To furthermore avoid the radiation draft and the cold air draft at the exterior walls the heat resistance of the said walls is increased by insulation layers, preferably layers having low absorption for heat, for example, plastic foam. In the room shown in FIG. 1, the exterior wall 10 is covered with such an insulation layer 20; the inner wall 18 and the ceiling 19 each carry insulation covers 21 and 22 respectively. The surfaces of the said insulations 20, 21 and 22 exposed to the room are provided with layers 23, 24 and 25, of heat reflecting material (wall paper or wall curtain) so that their surfaces acquire a temperature $T_1$, which is not appreciably lower than the temperature of the air in the room. The surfaces exposed to the room are heated to the said temperature $T_1$ practically exclusively by a heat stream $J = \alpha_{si}(T_{si} - T_1)$ caused by radiation exchange with the boundary surfaces of the room having a radiation temperature $T_{si}$. The thermal transmittance $\alpha_{si}$ is defined by the emissivity $\epsilon_w$, Bolzmann's coefficient $\sigma = 4.96 \cdot 10^{-8}$ kcal. per square meter and (° C.)$^4$ and the average temperature $$T_{si,1} = \tfrac{1}{2}(T_{si} + T_1)$$

according to $\alpha_{si} = 4\epsilon_w \sigma (T_{si,i})^3$. The heat stream J flowing towards the exterior wall 10 causes a temperature gradient $T_i - T_{ea} = J/K'$ wherein $K'$ is the heat transmittance characterizing the heat resistance of an exterior wall between the inner surface and the outdoor surroundings and $T_{ea}$ is the effective temperature of the surroundings averaged from the air and the radiation temperature.

An exterior wall being formed of hollow bricks and having an overall thickness of 33 cm. and a thermal transmittance $\alpha_z = 1.9$ kcal./m.$^2 \cdot$° C., covered at the inner surface by an aluminium foil and carrying thereupon in a distance of 2 cm. (thermal transmittance of the intermediate space $\alpha_{zw} = 1.5$ kcal./m.$^2 \cdot$h.$\cdot$° C.) a 5 cm. a thick covering of a material available under the name Styropor which carries at the surface exposed to the first mentioned aluminium foil a further such foil which covering has a thermal transmittance of $$\alpha_{st} = 0.03 \; \frac{\text{kcal.}}{\text{m.h.°C.}} \cdot \frac{1}{0.05\text{m.}} = 0.6 \; \frac{\text{kcal.}}{\text{m.}^2\text{h.°C.}}$$

is characterized by a $K'$ value measured at a wind velocity of 5 meter per second of $$K' = \left(\frac{1}{\alpha_{st}} + \frac{1}{\alpha_{zw}} + \frac{1}{\alpha_z} + \frac{1}{\alpha_a}\right)^{-1} = 0.32 \; \text{kcal./m.}^2\text{n.°C.}$$

The temperature $T_i$ of the inner wall surface used in the above two equations of the heat stream J may be predetermined. This temperature should be equal to the air temperature $T_{Li}$ in the room. If $T_i = T_{Li}$ then the emissivity $\epsilon_w$ of the inner surface must be for a given value of the heat transmittance $K'$:

$$\epsilon_w = \frac{K'}{40T^3_{si,L}} \cdot \frac{T_{Li} - T_{ea}}{T_{si} - T_{Li}}$$

With values $T_{si} = 23°$ C., $T_{Li} = 18°$ C., $T_{ea} = -15°$ C. and the above mentioned value of $K'$ the required thermal emissivity of the wall surfaces is $\epsilon_w = 0.45$. To realize such an emissivity the wall has to be furnished with a suitable cover (light wallpaper, light curtain) or be covered with a layer of high heat reflectivity. Such a layer should be perforated so that the ratio of surfaces of the remaining layer to the whole wall is $\epsilon_w$ to one.

The use of such a perforated high reflecting layer is advantageous in that the impacting heat radiation is reflected in an amount of $1 - \epsilon_w = 0.55$ so that 55% of this radiation goes back in the room. The exterior wall has then the radiation temperature:

$$T_{sw} = \sqrt[4]{T_{si}^4 - \epsilon_w(T_{si}^4 - T_i^4)} = T_{si} - \epsilon_w(T_{si} - T_i)$$

for the mentioned example and with the assumption of an outdoor temperature of $-15°$ C. the radiation temperature of the exterior wall is:

$$T_{sw} = 23° \text{ C.} - 0.45(23 - 18)° \text{ C.} = 20.8° \text{ C.}$$

and hence about 3° C. higher than the air temperature in the room and only about 2.2° C. lower than the radiation temperature of the other boundary surfaces of the room.

All furniture present in the room shown in FIG. 1 after a heating up period acquires a temperature at which its radiation is equal to the heat radiation of the room, i.e. it absorbs and emits the same amount of heat radiation.

In a normal case it is heated up to the average radiation temperature of the room and hence causes a heating up of the air in the room. Such a heating effect of air may be limited if desired by covering the great furniture pieces with a heat reflecting layer.

The fan 27 provided in the room of FIG. 1 sucks in fresh air through the opening 26 and distributes this air uniformly and without drafts in the room in an amount necessary to lower the air temperature in the room according to the above mentioned rules. The air exchange may be assisted, if desired, by removing used air from the room, preferably through a window chimney of the design described in the former patents. In place of the air distribution along the ceiling by channel 28 shown in FIG. 1, in which case the air may also be distributed by fan, an intermediate ceiling provided with a plurality of outlet holes may be used.

The results attained with the improved method according to the present invention will now be described by means of measurements carried out in a test room designed according to FIG. 1. This test room was equipped with a compound window 11 of the design described above together with FIGS. 5 and 6 having six foils 30 each 6 microns thick extending wrinkle free and plane-parallel between the inner and the outer window pane 12 and 13 with a spacing of 5 mm. between adjacent planes and made from polyethylene-terephthalate. The floor 14 was covered with a thin layer of polyphenylchloride and all walls 10, 18 and the ceiling 19 were laminated with heat reflecting bright rolled and punched aluminum sheets.

Figure 2:
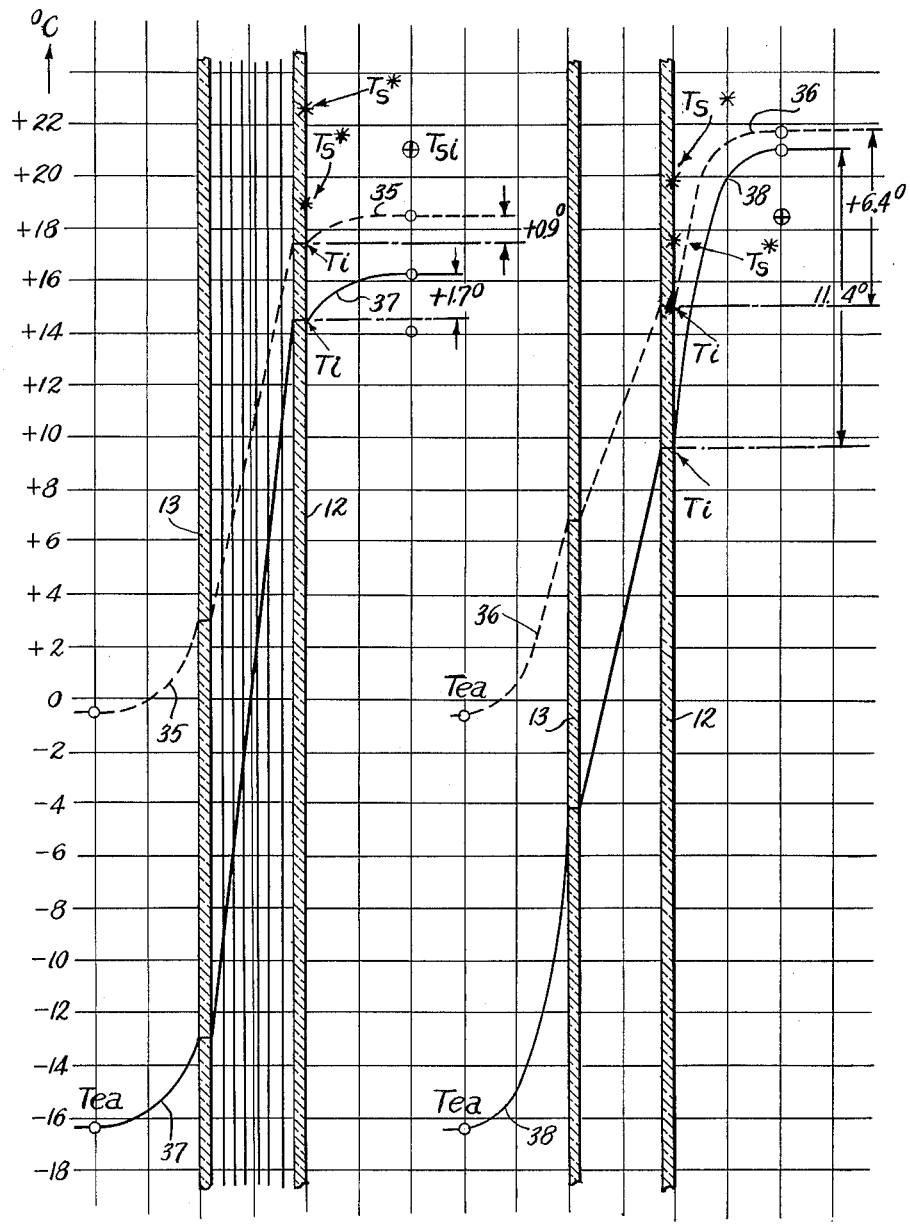
FIG. 2 is a diagram to explain the effect of the compound windows used in the room according to FIG. 1 in comparison to a conventional double window.

The equalization achieved in a room according to FIG. 1 between the effective radiation temperature $T_s^*$ of the inner window pane 12 and the air temperature in the room is shown by the measured results plotted in the diagrams of FIG. 2 for two different outdoor temperatures.

At an outdoor temperature of $T_{ea} = -0.5°$ C. and an air velocity of 3 km. per hour in a height of 15 meters, an average radiation temperature $T_{si}$ was maintained in the room at 20.8° C. according to FIG. 2a. From the curve 35 will be seen the course of the temperature and the true temperature of the inner window pane 12 having a value of $T_i = 17.5°$ C. and equalized up to $+0.9°$ C. to the temperature $T_{Li} = 18.3°$ C., of the air in the room while the effective radiation temperature $T_s^* = 22.4°$ C. of the inner pane 12 caused by penetrating light has exceeded the average radiation temperature $T_{si}$ of the room by $+1.6°$ C. In contrast therewith will be seen in FIG. 2b and curve 36 the situation in a similar room having a normal double window and being heated by a radiator (not arranged below the window) to an air temperature $T_{Li} = 21.6°$ C. and a radiation temperature $T_{si} = 20.8°$ C.; the effective radiation temperature $T_s^*$ of the inner pane 12 was only 1° C. lower than that of the room but its true temperature $T_i$ was about 6.4° C. lower than the air temperature, so that an unpleasant cold air draft was present.

Particularly conspicuous was the difference of the temperature conditions to be measured in the test room of FIG. 1 designed according to the improved method of the present invention and in the above mentioned comparison room at an outdoor temperature of $T_{ea} = -16.2°$ C. and an air velocity of 9 to 10 km. per hour in a height of 15 meters. The curve 38 in FIG. 2b shows the conditions in connection with the comparison room with a temperature $T_i$ of the inner pane 12 which is 11.4° C. lower than the temperature $T_{Li} = 21.0°$ C. of the air in the room. In contrast therewith the inner pane 12 in the test room had—according to curve 37 in FIG. 2a—a temperature $T_i$, which is compared to the radiation temperature $T_{si}$ of the room 0.4° C. higher or 1.7° C. lower as a function of the fresh air amount supplied to the room. In the last mentioned case the effective radiation temperature $T_s^*$ of the inner pane 12 is only 1° C. lower than 20° C. and it was possible to stay for hours in this radiation climate with an outdoor temperature of −16° C., near the window without any discomfort due to radiation draft or cold air draft. Hence the present improved method permits working near a window without the necessity of installing heating means below the window, and thus, in rooms designed according to the invention the space may be completely utilized.

The above mentioned temperature values measured at a compound window 11 having six foils without layers in the intermediate space between inner and outer window pane 12 and 13 enable the evalution of the corresponding thermal transmittance:

$$\alpha_F = \frac{T_{si} - T_i}{T_i - T_a} \cdot 4\epsilon\sigma\left(\frac{T_{si} + T_i}{2}\right)^3$$

with the result of an $\alpha_F$ between 1.02 and 1.04 kcal./m²h.° C. a value being about five times smaller than the thermal transmittance of a normal double window. At an outdoor air velocity of 3 km. per hour during the measurement of curve 35 in FIG. 2a the described compound window 11 showed a value K of $$K = \frac{T_{si} - T_i}{T_{si} - T_{ea}} \cdot 4\epsilon\sigma\left(\frac{T_{si} + T_i}{2}\right)^3 = 0.69 \frac{\text{kcal.}}{\text{m}^2\text{h.·grd.}}$$

and at an air velocity of 9 to 10 km. per hour during the measurement of curve 3 a corresponding value $K = 0.93$ kcal./m.²° C. Using only six polyester foils in a compound window 11 the resulting K coefficient was near the value of $K = 0.6$ kcal./m.²h.° C. which is required to maintain $T_i = 18°$ C. at a radiation temperature $T_{si} = 23°$ C. and an effective outdoor temperature $T_{ea} = -15°$ C.

Figure 3:
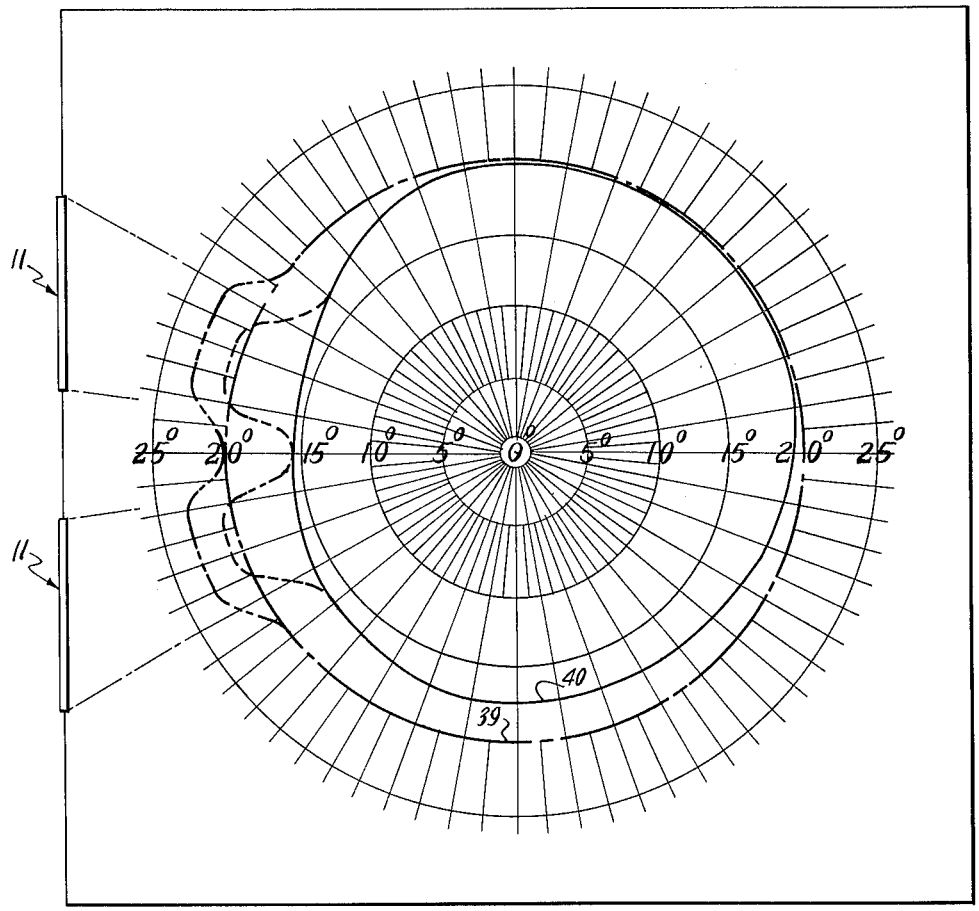
FIG. 3 is a polar diagram showing the radiation temperature measured at the middle of the room of FIG. 1.

The good equalization of the radiation temperatures $T_{si}$ which are essential for the heat perception in a room according to FIG. 1 will be seen in FIG. 3. In the centre of the test room of FIG. 1 the radiation temperature values were measured in different directions and in FIG. 3 plotted in polar coordinates. The outer curve 39 shows the values of $T_{si}$ in the room of FIG. 1 and the inner curve 40 the $T_{si}$ values in the above mentioned comparison room heated by a radiator. While the radiation temperature in the comparison room according to curve 40 is towards the exterior walls 3 to 5° C. lower than 20° C., the curve 39 for the radiation climated room according to FIG. 1 shows a nearly complete equalization of the radiation temperature values caused by the heat reflecting layers covering the walls. The heat removal from a human body in a room like FIG. 1 having a real radiation climate is much more uniform in all directions than in the comparison room being heated by a radiator. The bulges of both curves towards the windows 11 are caused by the effect of the sky radiation penetrating the windows. Such positive deviations from the value 20° C. are not perceived unpleasant. The improvement of the present method is based on the fact that the air in the room does not function as a heat carrier for heating up the exterior walls and the inner window pane—a purpose for which the air is unsuitable because of the desired low air velocity and its low heat capacitance—but a radiation exchange takes place between the large tempered floor area and the exterior walls and the windows.

The air temperature in the whole room according to FIG. 1 is unusually uniform because on the one hand the uniformly supplied cold fresh air causes an equalization of the air temperature in the room with the true temperature values of the walls and the windows, and because on the other hand the heat reflecting designed and adiabatic inner walls acquire the temperature of the air in the room. Hence movements of the air are caused only by the supplied fresh air and the persons staying in the room.

Figure 4A:
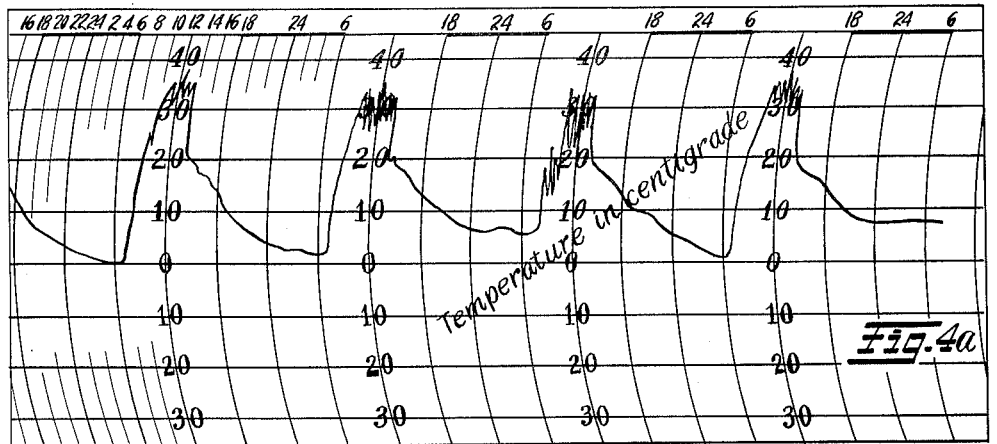
FIGS. 4a to 4c are three record strips showing the temporary values of the temperatures outdoors and inside the room of FIG. 1 and in a room of normal design, respectively.
Figure 4B:
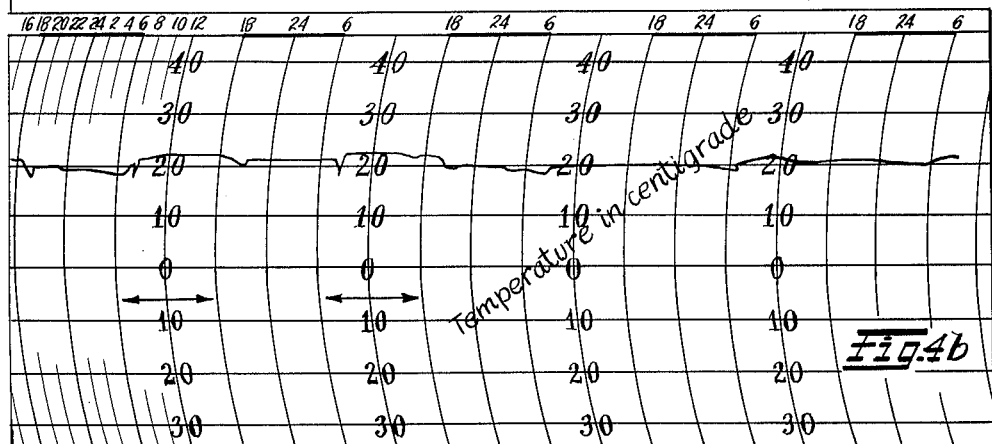
Figure 4C:
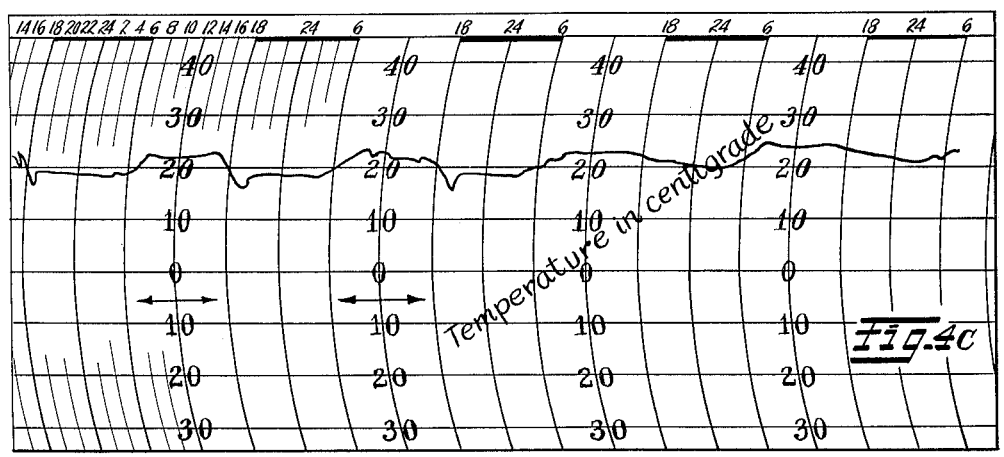

It is remarkable to what degree the temperature of the radiation climate in a room like FIG. 1 is independent of the prevailing outdoor temperature. The recording strips of FIG. 4 show the temperature course during about 100 hours according to measurements with a blackened thermograph probe. The outdoor temperature will be seen from FIG. 4a as varying between 0° C. and $+38°$ C. In a room like FIG. 1 having a radiation climate and a constant floor temperature of 21° C. the deviations of the room temperature are seldom larger than ±1° C. according to the strip of FIG. 4b; singular larger deviations are caused by an air draft during an opening of the window. In the usual comparison room heated by a radiator the temperature varies daily at least ± 2.5° C., as seen in the record strip of FIG. 4c.

The present improved method and a room designed according to FIG. 1 are advantageous and suitable not only for low but also for high outdoor temperatures. By maintaining the floor cool during the summer by supplying a cooling medium to the elements 16 at a temperature of about 22° C. there is no unpleasant heating up of rooms in buildings having outer walls made from glass. A compound window with eight intermediate transparent foils reflects about 50% of the sun radiation impacting the outer window pane so, that only 47% of the sun radiation penetrates the window. Hence the heating up of the room by sun radiation is decreased to about 58%. Caused by the high thermal resistance of such a compound window, with an outdoor temperature of 31° C. the inner window pane is not more than 1.6° C. higher than the average radiation temperature $T_{si}$ of the room and a person being exposed to sun radiation for times in such a radiation climate does not perceive troublesome heat. Psychologically this condition causes during hot summer days an impression that the outdoor temperature is not unpleasantly high. The impression of an entire fresh climate is further amplified by the supplying of cooled fresh air.

It should be pointed out that the window chimney described in the former patents may be used in place of or in addition to a compound window designed according to FIGS. 5 and 6 by arranging the foils plane-parallel between the inner window pane and the transparent sheet or foil closing the window niche. The used air may be removed from the room vertically through the said chimney as described in the former patents. In the last mentioned case it is important that the radiation temperature of the other boundary surfaces of 20 to 23° C. is attained or exceeded by the effective radiation temperature of the closing sheet or foil of the window chimney.

By referring to the floor as "temperable" or "tempered" applicant means that the temperature thereof is controllable such as by means of the heating or cooling device 16.

What I claim is:

1. In a room construction: wall means defining the boundary surfaces of said room; at least one of said wall means having a window therein; another of said wall means having means for heating and cooling the same whereby to control the temperature thereof, said other wall means having high heat absorbing and heat radiating characteristics; said wall means having inner surfaces highly reflective of heat radiation in the range of about 300° K. and of low heat absorbing capacity and having heat insulation under said reflective surfaces; said window comprising spaced inner and outer glass panes and a plurality of thin, spaced and parallel transparent foils therebetween and extending in taut condition across the area of said window, the distance between said foils being from 2 to 19 mm. and said foils having a refraction and/or absorption coefficient for radiant heat greater than that for visible light.

2. A room as defined in claim 1, wherein at least one of said foils is provided with a transparent layer of $\lambda/4$ thickness.

3. A room as defined in claim 1 wherein the thickness of said foils is a function of the refraction coefficient $n$ for radiant heat, said function being $1/2n$ to $3/2n$ times the value for that wavelength containing a maximum of the spectrum of radiant heat of 300° K., when measured in air.

4. A room as defined in claim 1 wherein the thickness of said foils is a function of the refraction coefficient $n$ for radiant heat, said function being in the range of $1/2n \times (6.5 \ldots 32)$ microns.

5. A room as defined in claim 1 wherein the spaces within said window contain a dry gas having a lower heat conductivity than air.

6. A room as defined in claim 1 including electrical heating filaments in the space between said inner glass pane and the adjacent foil.

7. A room as defined in claim 1 wherein said inner pane is of electrically conductive glass with current supply electrodes at opposite edges thereof.

References Cited by the Examiner

UNITED STATES PATENTS

| | | | |
|---|---|---|---|
| 1,957,279 | 5/1934 | Linke | 20—56.5 X |
| 2,094,381 | 9/1937 | Slayter | 20—56.5 |
| 2,269,566 | 1/1942 | Van Daam | 219—522 X |
| 2,352,821 | 7/1944 | Conboie | 98—33 |
| 2,354,292 | 7/1944 | Waterman | 98—33 |
| 2,420,879 | 5/1947 | Herter | 20—56.5 X |
| 2,444,976 | 7/1948 | Brown | 20—56.5 |
| 2,497,507 | 2/1950 | McMaster | 219—522 |
| 2,557,905 | 6/1951 | Burton et al. | 219—522 |
| 2,625,640 | 1/1953 | Gaiser et al. | 219—522 |
| 2,650,976 | 9/1953 | Gaiser et al. | 219—522 |

RICHARD M. WOOD, *Primary Examiner.*

C. L. ALBRITTON, *Assistant Examiner.*